April 1, 1924. 1,488,547
H. W. MELLING
LATHE
Original Filed Feb. 28, 1921 4 Sheets-Sheet 1
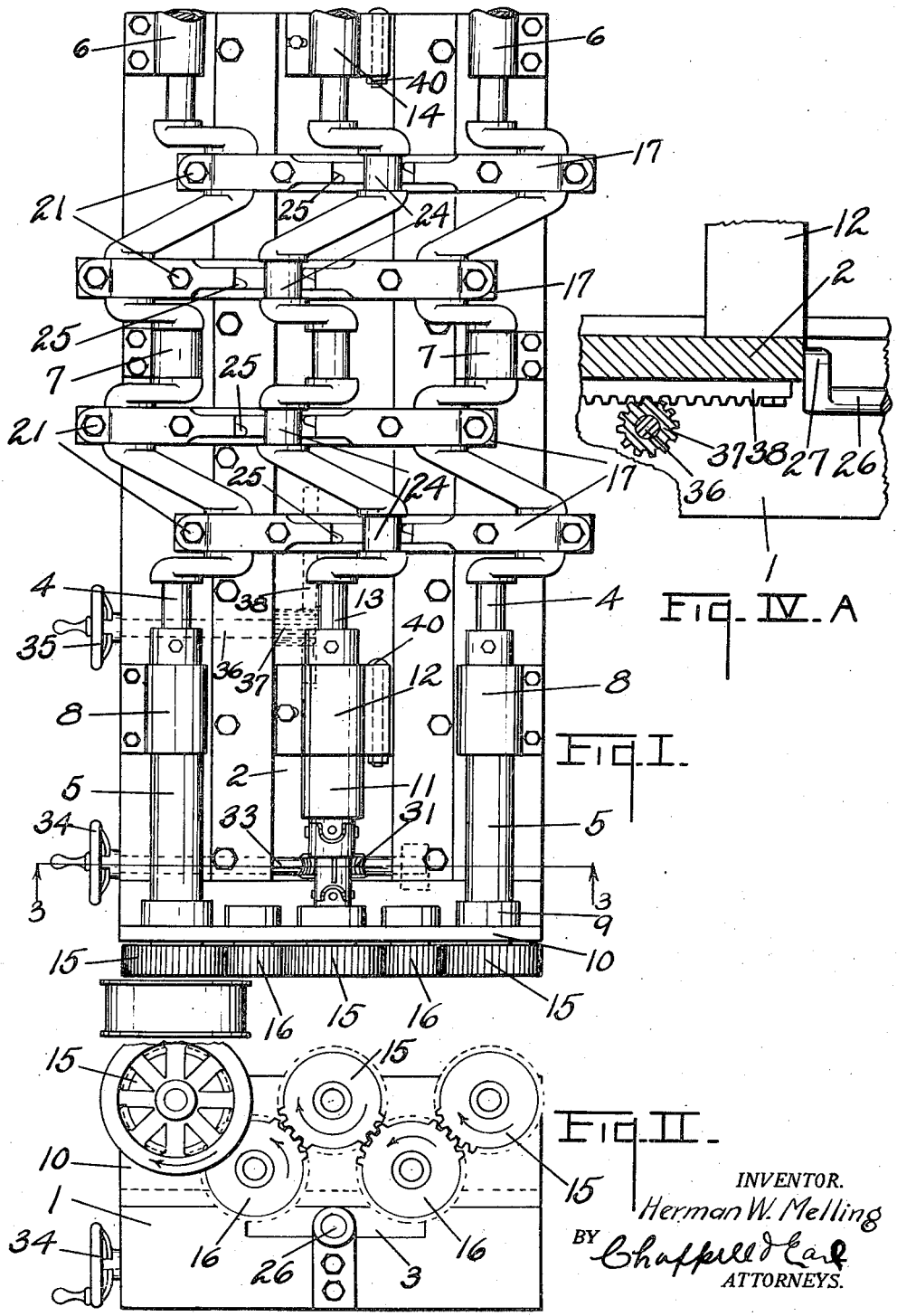

April 1, 1924.
H. W. MELLING
LATHE
Original Filed Feb. 28, 1921    4 Sheets-Sheet 2
1,488,547
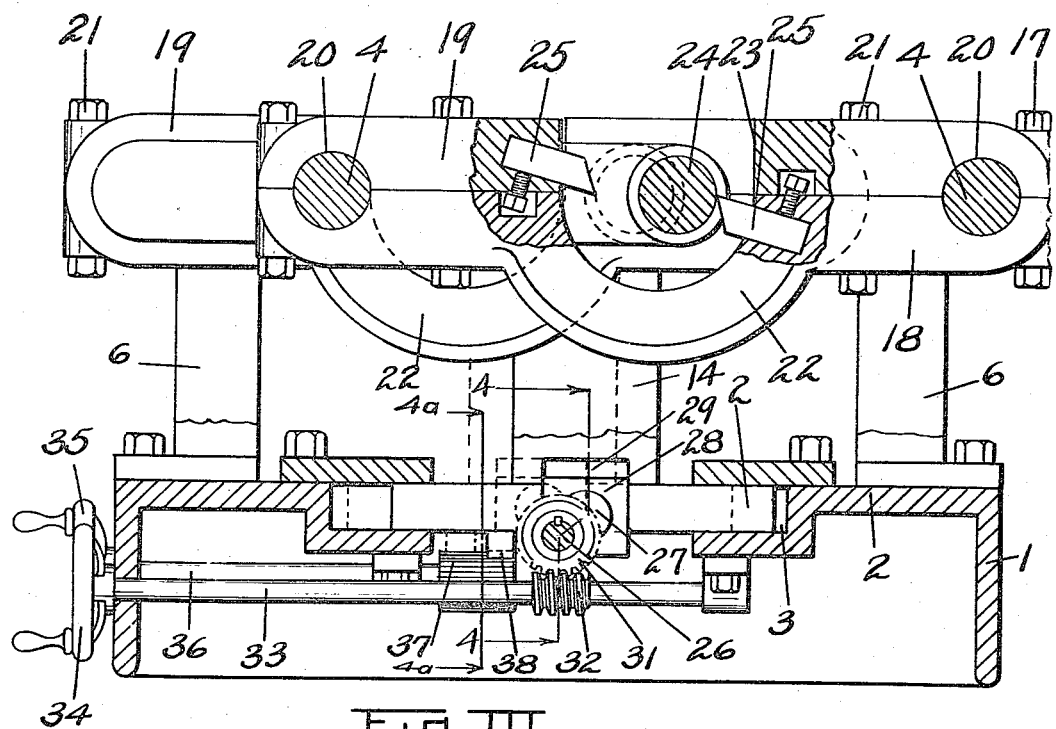
Fig. III.
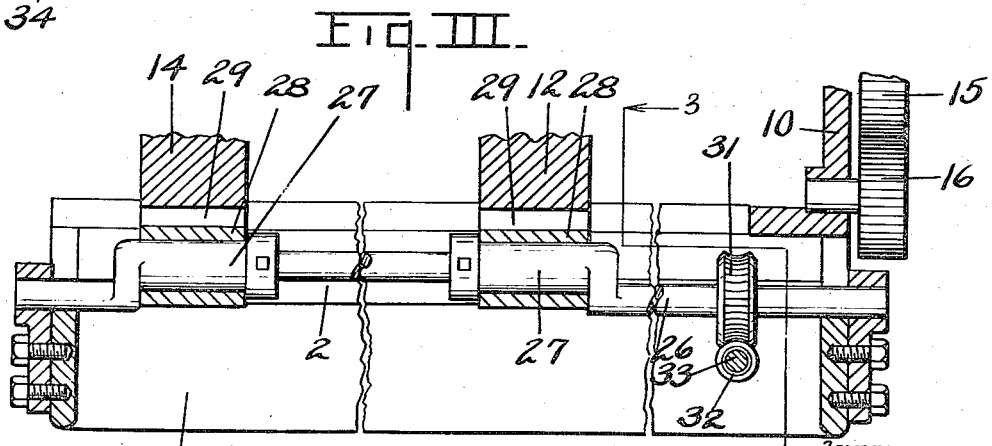
Fig. IV.
INVENTOR.
Herman W. Melling
BY Chappell & Earl
ATTORNEYS.

April 1, 1924.
H. W. MELLING
LATHE
Original Filed Feb. 28, 1921    4 Sheets-Sheet 3
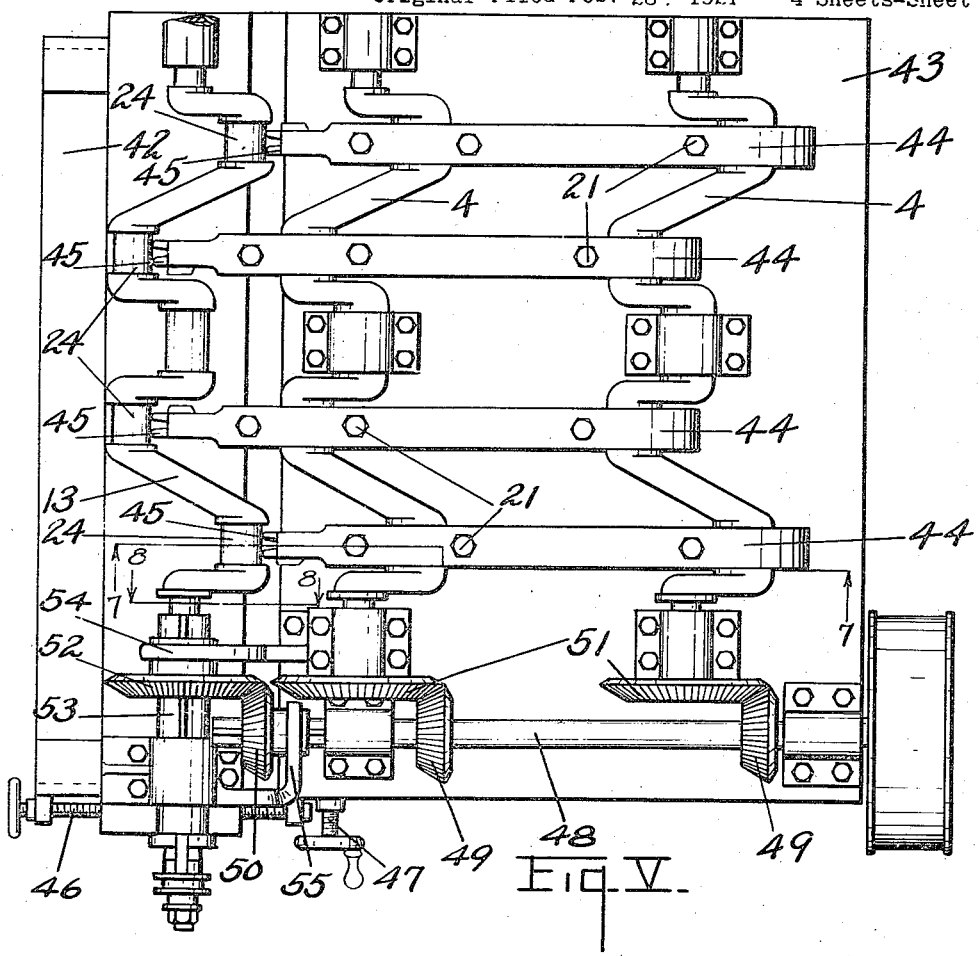
Fig. V.
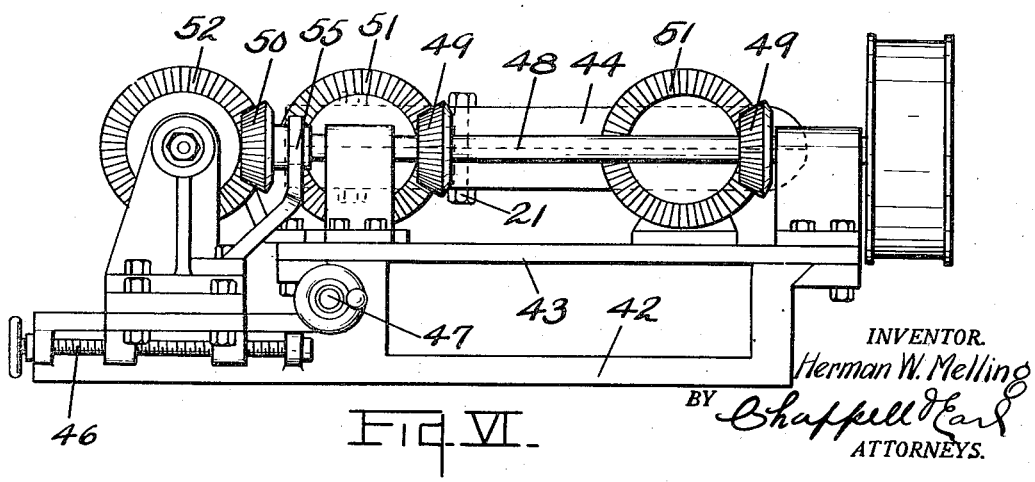
Fig. VI.
INVENTOR.
Herman W. Melling
BY Chappell & Earl
ATTORNEYS.

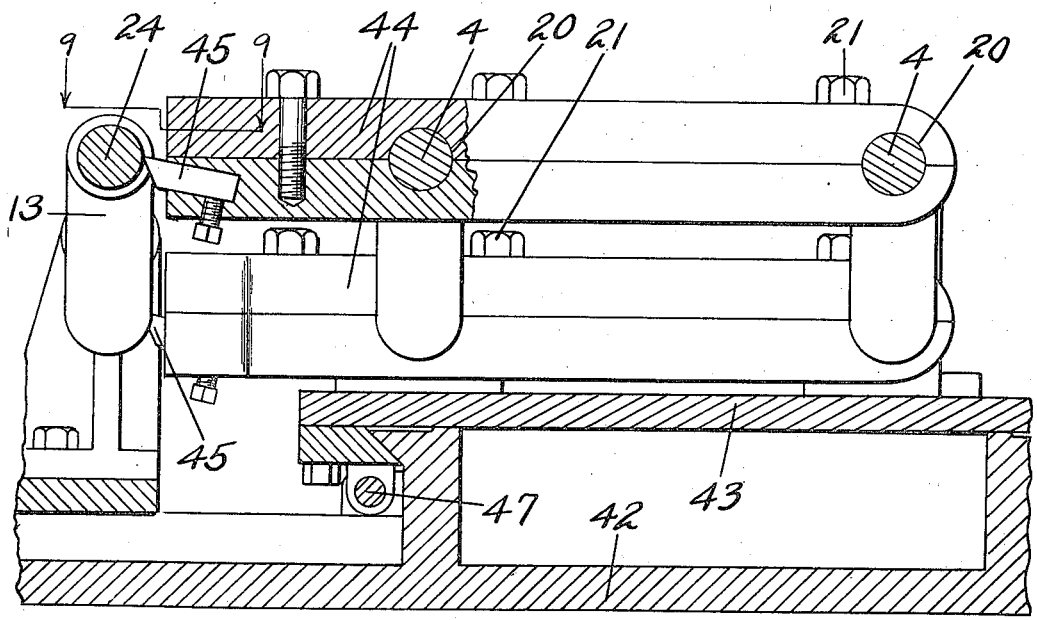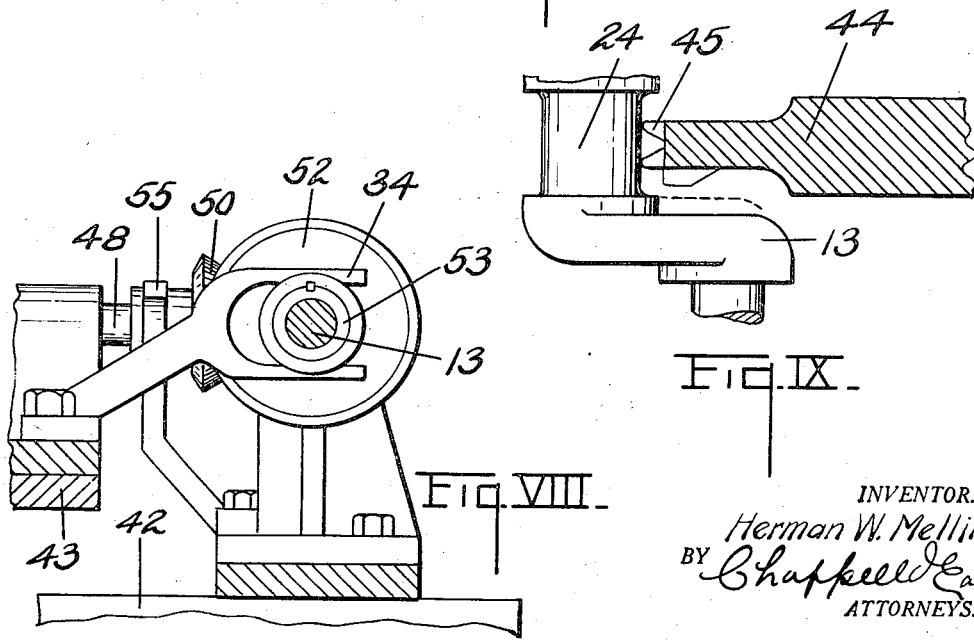

Patented Apr. 1, 1924.

1,488,547

UNITED STATES PATENT OFFICE.

HERMAN W. MELLING, OF JACKSON, MICHIGAN.

LATHE.

Application filed February 28, 1921, Serial No. 448,464. Renewed February 9, 1924.

*To all whom it may concern:*

Be it known that I, HERMAN W. MELLING, a citizen of the United States, residing in the city and county of Jackson, State of Michigan, have invented certain new and useful Improvements in Lathes, of which the following is a specification.

This invention relates to improvements in lathes.

The main objects of this invention are:—

First. To provide an improved lathe for the turning of the crank pins of crank shafts.

Second. To provide an improved lathe for the turning of the crank pins of shafts by means of which the pins may be rapidly and accurately turned.

Third. To provide an improved lathe of the class described in which the work requires but little finish grinding.

Fourth. To provide an improved lathe adapted for the work stated, which is of large capacity and convenient to operate and which is also simple and economical in structure and durable in use.

Further objects and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a plan view of a lathe embodying the features of my invention, parts being shown conventionally.

Fig. II is an end elevation.

Fig. III is a transverse vertical section on a line corresponding to line 3—3 of Figs. I and IV, parts being shown in full lines for convenience in illustration.

Fig. IV is a detail vertical longitudinal section on a line corresponding to line 4—4 of Fig. III, parts being shown in full lines.

Fig. IV^A is a detail vertical longitudinal section showing details of the work carriage feed.

Fig. V is a plan view of a modified form of my invention.

Fig. VI is an end elevation of the structure shown in Fig. V.

Fig. VII is a detail vertical transverse section on a line corresponding to line 7—7 of Fig. V.

Fig. VIII is a detail transverse section on a line corresponding to line 8—8 of Fig. V.

Fig. IX is a detail view partially in horizontal section on a line corresponding to line 9—9 of Fig. VII.

In the drawing similar reference characters refer to similar parts throughout the several views, and the sectional views are taken looking in the direction of the little arrows at the ends of the section lines.

In the embodiment illustrated in Figs. I to IV^A inclusive the numeral 1 indicates the bed of the machine and 2 the work carriage, which is mounted in ways 3 for longitudinal and transverse adjustment. On the bed of the machine is mounted a pair of master cranks 4 in spaced parallel relation. These cranks are supported at one end by the live spindles 5 and at their other ends by the bearings 6 and at their center bearings by the bearings 7; the master cranks illustrated being four-throw cranks and having bearings at their ends and at the center.

The spindles 5 are supported by the bearings 8 and the bearings 9 on the upright 10 at one end of the machine. It is desirable that the master cranks be supported so as to have but little lost motion or vibration. The worktable 2 is supported between these master cranks. On the worktable is a work spindle 11 supported by the bearing 12, the work 13, which is a four-throw crank, a duplicate of the master cranks, is supported by this live spindle 11 and by bearing 14 at the outer end of the worktable, so that the axes of the two master cranks and the work are in the same plane. The master cranks and the live spindle are connected by the gears 15 and 16, so that they are driven in the same direction and at the same speed.

The tool holders 17 are mounted upon the corresponding throws of the master cranks, the tool holders being preferably formed of sections 18 and 19 having coacting bearing portions 20; see Fig. III, the sections or members being secured together by the bolts 21 so that they may be easily assembled upon the master cranks and are adjustable to take up any wear in the bearings. The tool holders shown in the embodiment shown in the Figs. I and IV^A inclusive have offsets 22 providing recesses 23 receiving the pins as 24 of the corresponding throws of the work. That is, the throws correspond to the throws of the master cranks on which the tool holders are mounted. The tools or cutters 25 are mounted in oppositely disposed relation, only one cutter of each pair being in operation at a time, and the cutters being arranged so that one tool will cut from one end of the wrist pins to a point past the center and the other will cut from the other end of the wrist pin past each central point.

The work table is shifted laterally to bring one or the other of these tools into operation by means of the rock shaft 26 disposed longitudinally below the work carriage and having an offset or crank arm 27, carrying blocks 28 engaging slots 29 in the depending arms on the work carriage. The rock shaft is provided with a worm wheel 31 with which the worm 32 on the shaft 33 coacts. This shaft is provided with a hand wheel 34. The purpose of this arrangement is to provide a construction which will permit a quick or rapid shifting of the table to bring either one or the other of the tools into operation relative to the work and to feed the work laterally to the tool.

The carriage is shifted longitudinally by means of a hand wheel 35 on the shaft 36, provided with a pinion 37 meshing with the rack 38 on the under side of the work carriage. Pinion 37 is of such a length that it remains in mesh with the rack throughout the lateral adjustment of the work carriage. The upper members of the bearings 12 and 14 for the work spindle and work are hinged at 40 to facilitate the insertion and removal of the work. With the parts thus arranged the work is placed in the machine with one end supported by and secured to the work spindle so that it is driven thereby and the other end is supported by the bearing 14 in which position it is parallel with the master cranks.

With the cutters properly adjusted the machine is started and the work carriage manipulated by the means described, the crank pins are turned simultaneously and very accurately. In the modification shown in Figs. V and IX inclusive, the work table 42 is mounted at one side of the adjustable bed 43 carrying the master cranks 4. The tool holders 44 are mounted on corresponding throws of the master cranks substantially the same as described, the cutters 45, however, being mounted on the ends of the tool holders. In this embodiment the work carriage is mounted for lateral adjustment, which is accomplished by means of the feed screw 46, while the bed 43 is adjusted by means of the screw 47.

In this embodiment a driving shaft 48 is arranged transversely of the machine and is provided with beveled pinions 49 and 50. The pinion 49 meshes with gear 51 on the live spindles of the master cranks and the pinion 50 meshes with the pinion 52 splined to the work spindle 53, a bracket 54 on the bed 43 holding the gear 52 in proper relation to the pinion 50 as the bed 43 is shifted. A yoke-like bracket 55 on the work carriage holds the pinion 50 in proper relation at the same time permitting shifting of the work table and the bed to feed the work to the cutters and the cutters longitudinally of the work. With this arrangement the master cranks and the work are driven in the same direction and at the same speed, so that the cutters are maintained in proper relation to the work and the work rotated relative to the cutters.

My improved crank shaft lathe is of a large capacity and performs very accurate work, it being possible for an unskilled workman to successfully operate the same. I have not attempted to describe other embodiments or adaptations of my invention, which I contemplate, as I believe the disclosure made will enable those skilled in the art to which my invention relates to embody or adapt the same as may be desired.

Having thus described my invention, what I claim as new and desire to secure by Letters Patent, is:

1. In a crank pin lathe, the combination of a pair of master cranks mounted in spaced parallel relation, a work carriage mounted for transverse and longitudinal movement between said master cranks, a driven work spindle carried by said carriage, the carriage being adapted to support the work with its axis in the plane of the axes of the master cranks, driving means for said master cranks and said work spindle whereby they are driven at the same speed and in the same direction, link-like tool holders connecting corresponding throws of said master cranks and having yoke-like offsets providing recesses receiving the pins of the corresponding throws of the work, a pair of cutters mounted on said tool holders to project into said work recesses thereof in oppositely disposed relation, means for shifting said work carriage transversely for bringing either of the pair of tools into operative position, comprising a rock shaft disposed longitudinally of the work carriage and provided with a crank arm, blocks on the arm of said rock shaft, said work carriage being provided with arms slotted to receive said blocks whereby when the rock shaft is actuated the work carriage is shifted laterally, and means for feeding said work carriage longitudinally.

2. In a crank pin lathe, the combination of a pair of master cranks mounted in spaced parallel relation, a work carriage mounted for transverse and longitudinal movement between said master cranks, a driven work spindle carried by said carriage, the carriage being adapted to support the work with its axis in the plane of the axes of the master cranks, driving means for said master cranks and said work spindle whereby they are driven at the same speed and in the same direction, link-like tool holders connecting corresponding throws of said master cranks and having yoke-like offsets providing recesses receiving the pins of the corresponding throws of the work, a pair of cutters mounted on said tool holders to project into said work recesses thereof in oppositely disposed relation, means for shifting said work carriage transversely for bringing either of the pair of tools into operative position and means for feeding said work carriage longitudinally.

3. In a crank pin lathe, the combination of a pair of master cranks mounted in spaced parallel relation, a work carriage mounted for transverse and longitudinal movement between said master cranks, a driven work spindle carried by said carriage, the carriage being adapted to support the work with its axis in the plane of the axes of the master cranks, driving means for said master cranks and said work spindle whereby they are driven at the same speed and in the same direction, tool holders connecting corresponding throws of said master cranks, cutters mounted on said tool holders, means for shifting said work carriage transversely, comprising a rock shaft disposed longitudinally of the work carriage and provided with a crank arm, blocks on the arm of said rock shaft, said work carriage being provided with arms slotted to receive said blocks whereby when the rock shaft is actuated the work carriage is shifted laterally, and means for feeding said work carriage longitudinally.

4. In a crank pin lathe, the combination of a pair of master cranks mounted in spaced parallel relation, a work carriage mounted for transverse and longitudinal movement between said master cranks, a driven work spindle carried by said carriage, the carriage being adapted to support the work with its axis in the plane of the axes of the master cranks, driving means for said master cranks and said work spindle whereby they are driven at the same speed and in the same direction, tool holders connecting corresponding throws of said master cranks, cutters mounted on said tool holders, means for shifting said work carriage transversely, and means for feeding said work carriage longitudinally.

5. In a crank pin lathe, the combination of a pair of master cranks mounted in spaced parallel relation, a work carriage, a driven work spindle carried by said carriage, the carriage being adapted to support the work with its axis in the plane of the axes of the master cranks, driving means for said master cranks and said work spindle whereby they are driven at the same speed and in the same direction, link-like tool holders connecting corresponding throws of said master cranks and having yoke-like offsets providing recesses receiving the pins of the corresponding throws of the work, a pair of cutters mounted on said tool holders to project into said work recesses thereof in oppositely disposed relation, and means for feeding said work carriage longitudinally.

6. In a crank pin lathe, the combination of master cranks mounted in parallel relation, a work carriage, a driven work spindle carried by said carriage, driving means for said master cranks and said work spindle whereby they are driven at the same speed and in the same direction, tool holders connecting corresponding throws of said master cranks, pairs of cutters mounted on said tool holders in oppositely disposed relation, means for shifting said work carriage transversely for bringing either of the pair of tools into operative position, and means for feeding said work carriage longitudinally.

7. In a crank pin lathe, the combination of master cranks mounted in spaced parallel relation, a work carriage mounted for transverse and longitudinal movement between said master cranks, a driven work spindle carried by said carriage, the carriage being adapted to support the work with its axes in the plane of the axes of said master cranks, means for driving said master cranks and said work spindle at the same speed and in the same direction, tool holders carried by corresponding throws of said master cranks, and cutters mounted on said tool holders.

In witness whereof, I have hereunto set my hand and seal in the presence of two witnesses.

HERMAN W. MELLING. [L. S.]

Witnesses:
   BRYON E. LINABURY,
   E. L. FARRAND.